United States Patent [19]

Fixsen et al.

[11] 4,222,453
[45] Sep. 16, 1980

[54] REAR SUSPENSION SYSTEM FOR A SNOWMOBILE

[75] Inventors: Hubert Fixsen, Willmar; Roger Skime, Thief River Falls, both of Minn.

[73] Assignee: Arctic Enterprises, Inc., Thief River Falls, Minn.

[21] Appl. No.: 961,876

[22] Filed: Nov. 17, 1978

[51] Int. Cl.² ............................................. B62M 27/02
[52] U.S. Cl. .................................. 180/193; 180/9.54; 305/24
[58] Field of Search ..................... 180/193, 9.2 R, 9.5, 180/9.52, 9.54, 193; 305/24

[56] References Cited

U.S. PATENT DOCUMENTS

| 3,254,738 | 6/1966 | Larsen | 180/9.2 R |
|---|---|---|---|
| 3,485,312 | 12/1969 | Swenson et al. | 180/5 R |
| 3,690,394 | 9/1972 | Skime | 180/5 R |
| 3,705,637 | 12/1972 | Harvey | 180/5 R |
| 3,788,412 | 1/1974 | Vincent | 180/5 R |
| 3,931,861 | 1/1976 | Olsen | 180/5 R |
| 4,057,916 | 11/1977 | Roemer | 180/5 R |

*Primary Examiner*—John J. Love
*Assistant Examiner*—Donn McGiehan

*Attorney, Agent, or Firm*—Allegretti, Newitt, Witcoff & McAndrews

[57] ABSTRACT

An improved rear suspension for a snowmobile. The improved rear suspension includes a first link and a second link, each having a first end and a second end. An extensible, shock mounted link also has a first end and a second end. The first and second links are non-pivotal relative to each other. A first pivot is defined on the snowmobile frame, a second pivot is defined on the snowmobile frame rearwardly of the first pivot, and a third pivot is spaced downwardly of the first and second pivots. A fourth pivot is movably located relative to the first, second and third pivots. The first ends of the first and second links are pivotally carried by the first pivot, the second end of the first link is pivotally carried by the third pivot, the second end of the extensible link is pivotally carried by the second pivot, and the second end of the second link and the first end of the extensible link are pivotally connected together at the fourth pivot. The first and second links, the extensible link and the locations of the first, second, third and fourth pivots cooperate to define a suspension assembly for the rear of the drive belt support relative to the rear of the snowmobile frame while permitting significant relative movement between the drive belt support and the snowmobile frame.

21 Claims, 8 Drawing Figures

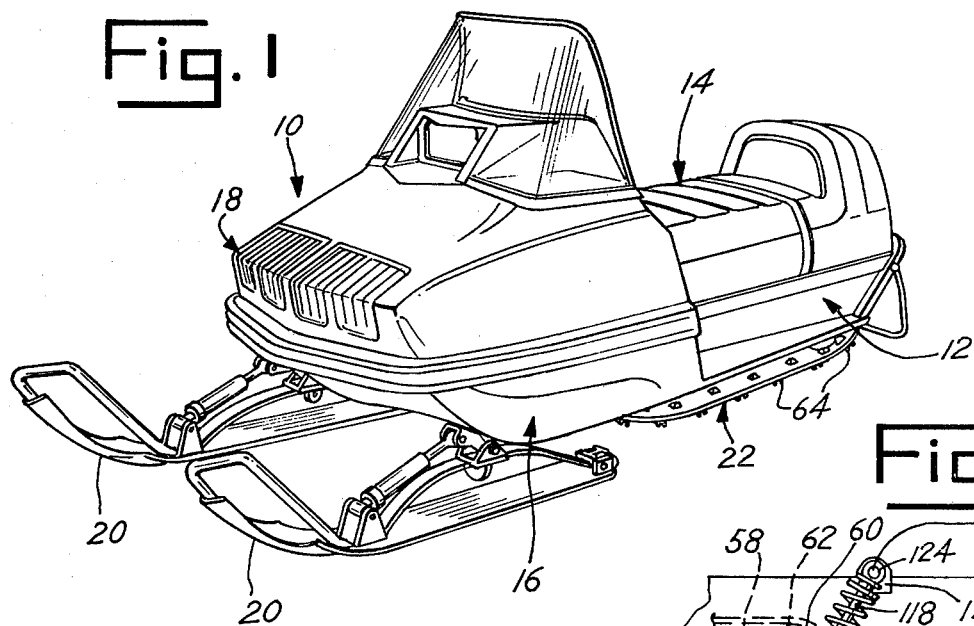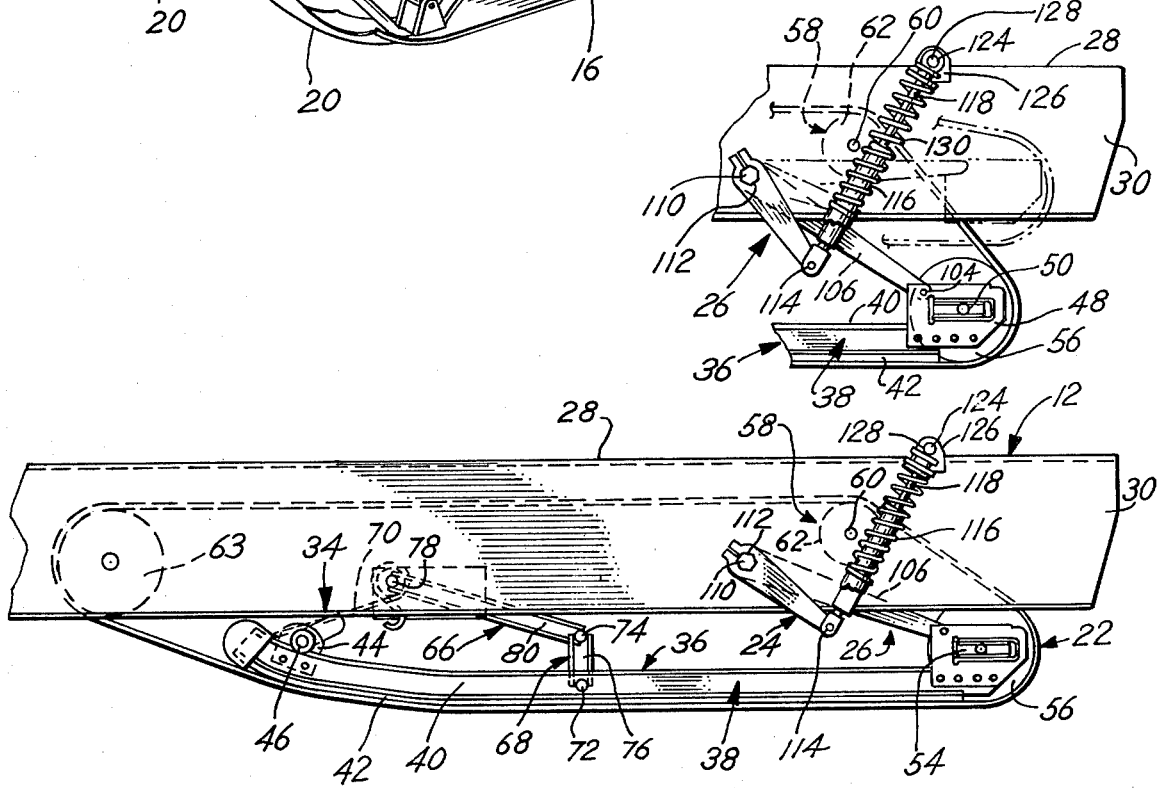

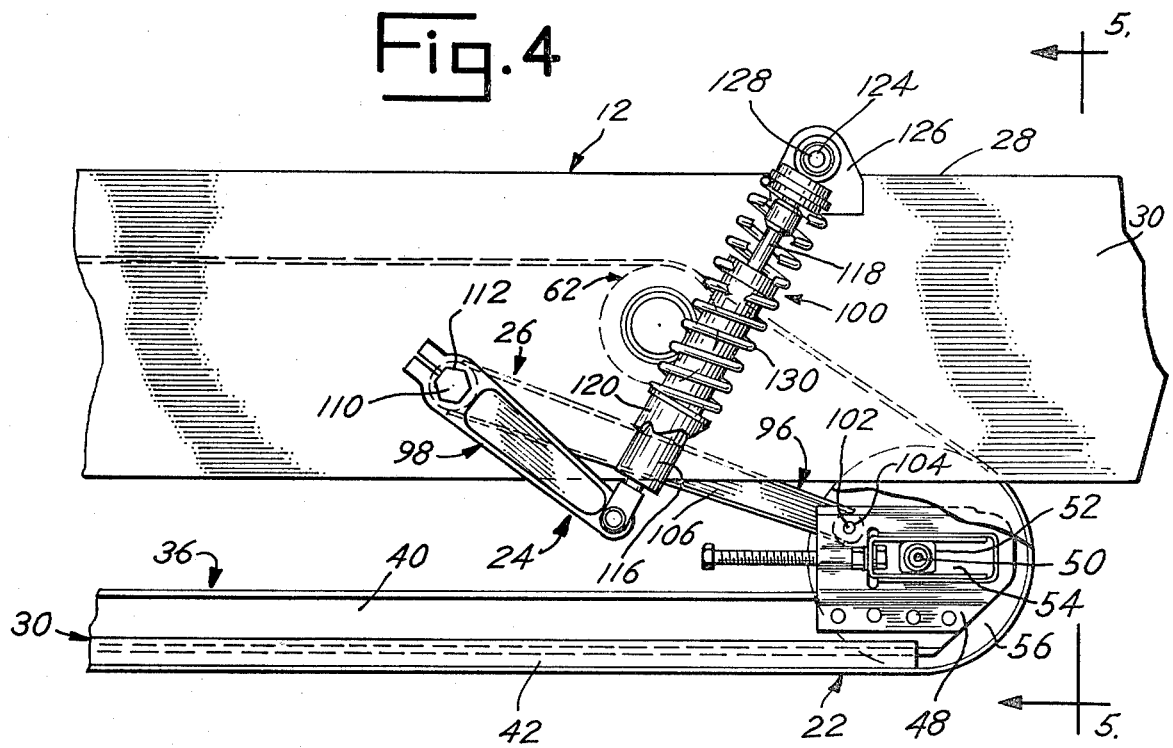
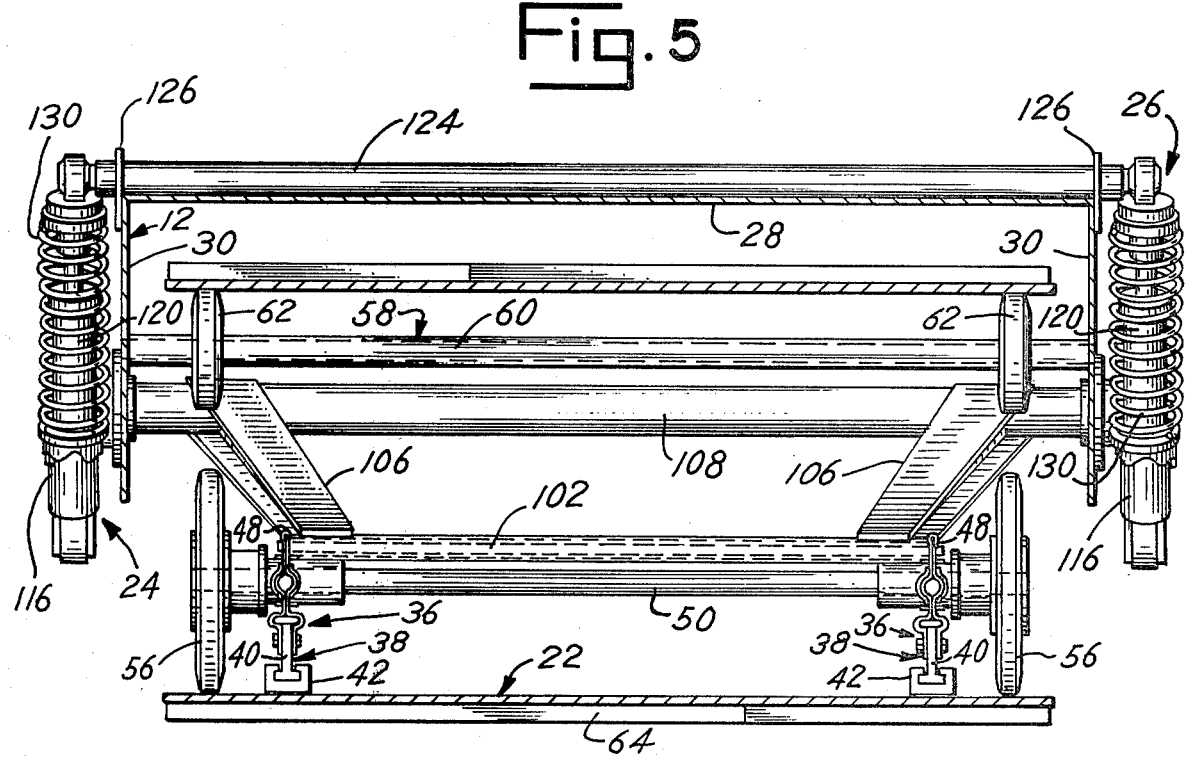

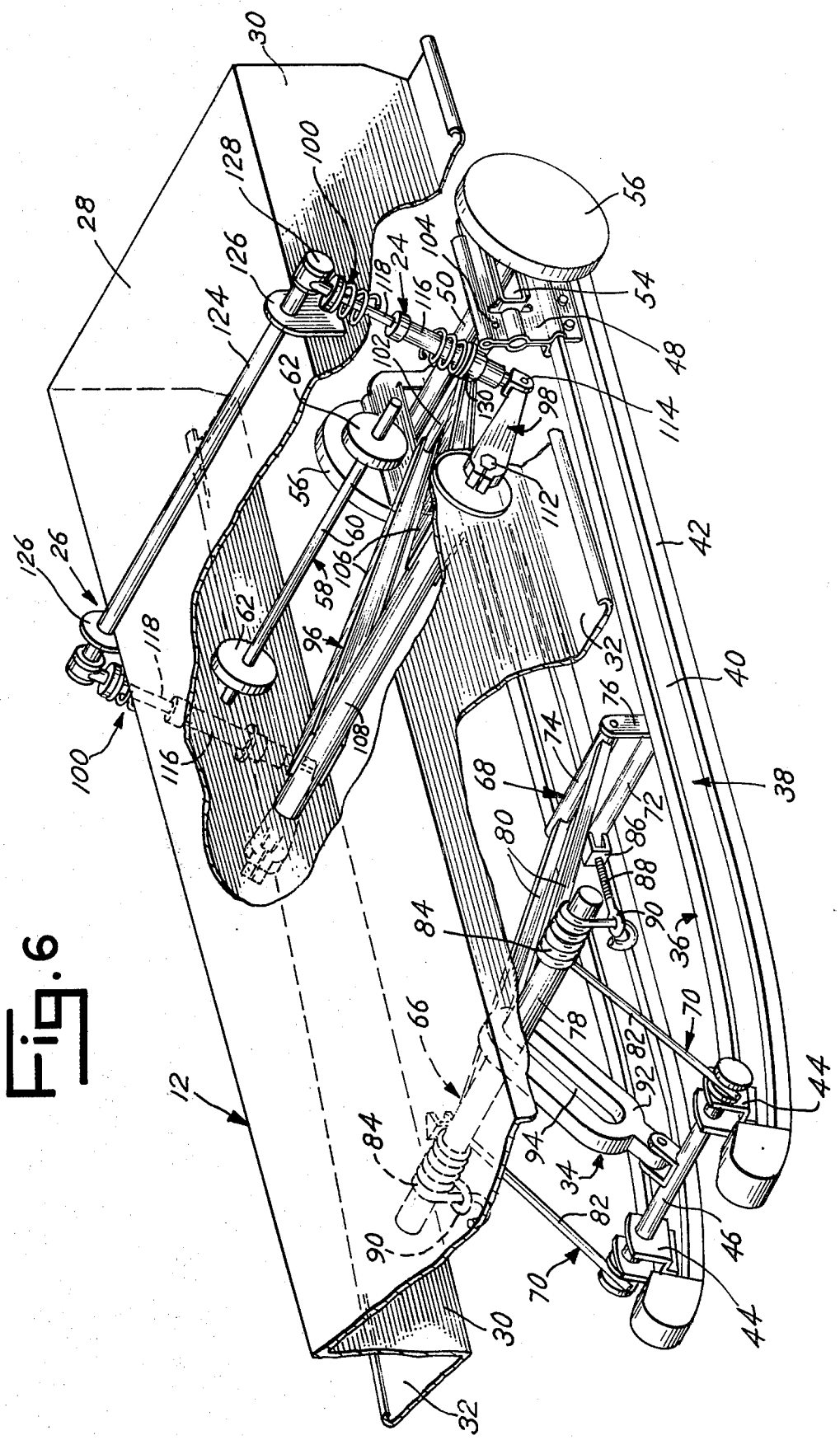

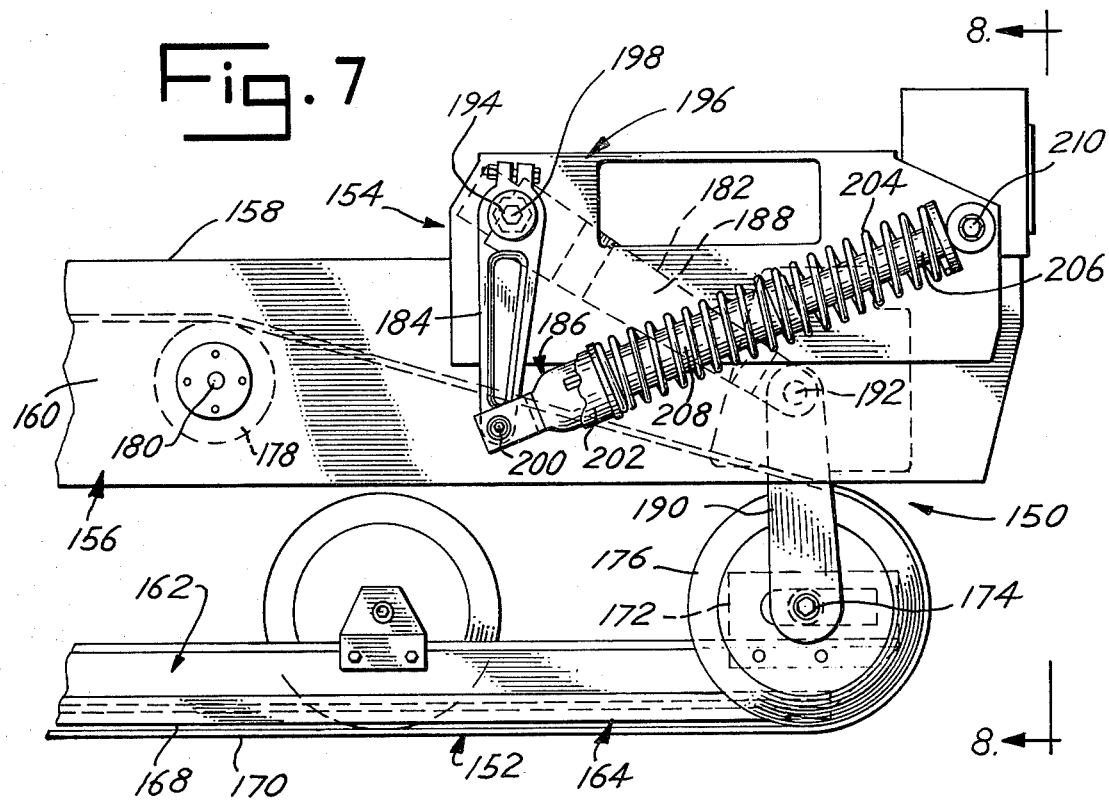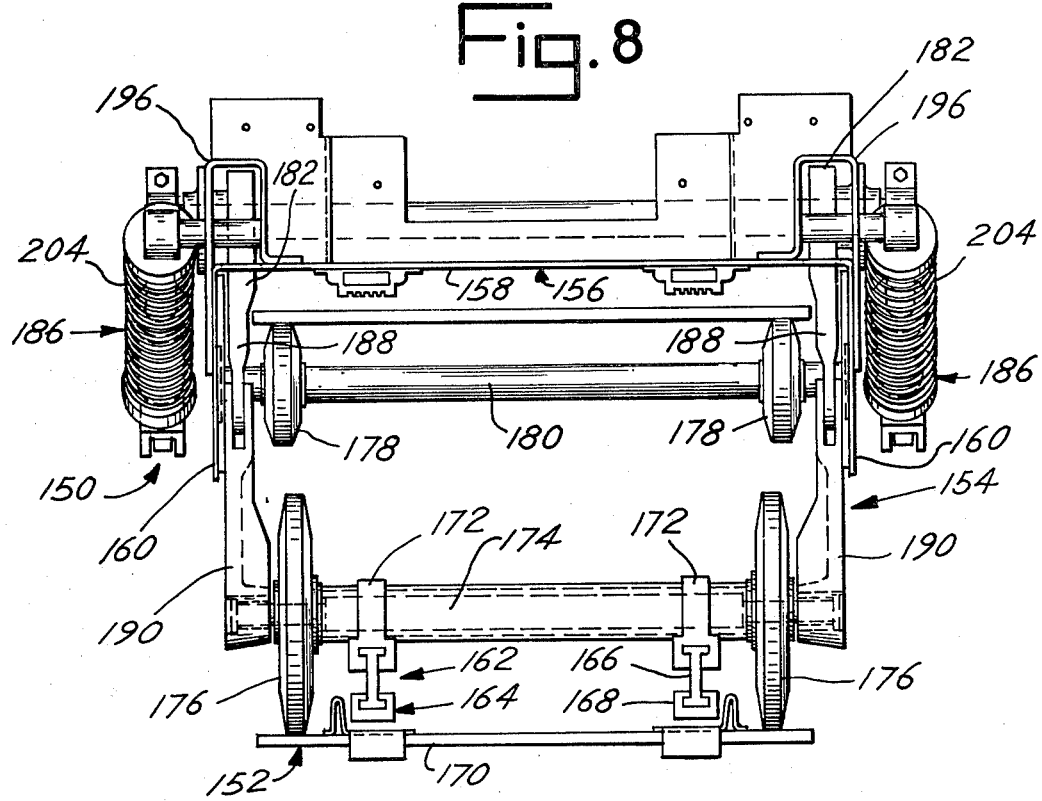

REAR SUSPENSION SYSTEM FOR A SNOWMOBILE

BACKGROUND OF THE INVENTION

Field of the Invention and Description of the Prior Art

This invention relates to an improved snowmobile suspension system and it particularly relates to an improved rear suspension system for supporting a snowmobile frame and a support assembly for a snowmobile drive belt, relative to each other.

It is well known that practically any land vehicle uses a suspension system between the body or frame of the vehicle, used to support a rider or riders, and the portion of the vehicle which supports the ground engaging parts, such as wheels or a continuous drive belt or track of a vehicle. This is true of automobiles, trucks, motorcycles, and the like. The present invention is specifically directed towards a suspension system used for supporting the frame or "tunnel" of a snowmobile, on which a rider sits, relative to the frame or support which operatively carries a continuous drive belt or drive track that propels the snowmobile. Known suspension systems for snowmobiles are shown in the prior art, for example, in Swenson Pat. No. 3,485,312; Skime Pat. No. 3,690,394; and Olson Pat. No. 3,931,861.

Generally speaking, there are two types of snowmobiles suspension systems, one being the slide rail type, such as, for example, shown in the Swenson Pat. No. 3,485,312, mentioned above, and the wheel type of support assembly. The present invention is directed to the rear suspension for a slide rail type of snowmobile suspension system.

The slide rail type of suspension system is considered the most popular type of suspension system for snowmobiles, because it provides for better performance, ride and stability. There are a wide variety of variations of slide rail suspension systems, but all involve the common feature of having the suspension system slide over the track surface rather than roll over the surface as found in the wheel type of suspension system. In some types of slide rail suspension systems, one or more pairs of wheels are mounted on the slide rail in order to reduce the force on the slide rail surface so as to reduce the wear of the slide member.

In recent years, there has been an increasing interest and emphasis on the trail riding usage of snowmobiles. Many users of snowmobiles, however, are not entirely satisfied with the quality of the ride provided by their snowmobiles. There are a variety of reasons for an unsatisfactory ride, but generally the unsatisfactory ride results from poorly maintained trail surfaces and from limitations in the conventional snowmobile suspension designs. Thus, although snowmobile suspension systems have been generally satisfactory, with increased usage of snowmobiles and with the need which has arisen to provide for an improved "ride", an improvement in the snowmobile suspension system is called for.

The major factors in a snowmobile design that affect ride quality include the spring rate or stiffness of springs used for the suspension system, the use of velocity sensitive shock absorbers in the suspension system, the vertical travel between the snowmobile frame or tunnel and the support frame for the track support, and the static deflection of the snowmobile. In order to provide for an improved ride, the rear suspension system calls for a softer or lower spring rate for the springs that cooperate to suspend the snowmobile frame relative to the drive track support and an increase in the vertical travel between the snowmobile frame and track support. The common maximum vertical travel is, at present, approximately four inches. The primary limiting factor in the current snowmobile suspension systems is that the ride rates, that is, the vertical spring rate component, decreases as the deflection between the frame and the track support increases. For this reason, high initial spring rates are required in order to preclude frequent bottoming of the snowmobile frame relative to the track support, particularly when the snowmobile is traversing bumpy terrain.

SUMMARY OF THE INVENTION

In view of the foregoing, it is an important object of the present invention to provide an improved rear suspension system for suspending or supporting the snowmobile support frame or tunnel relative to the support assembly that operatively carries the drive track or drive belt.

It is another significant object of the present invention to provide an improved rear suspension for a snowmobile wherein the suspension, using a spring-shock assembly, has a light spring rate for "ride-in" effect and has a progressive linkage assembly in which the spring travel or compression becomes progressively greater as vertical travel between the frame or tunnel and the drive belt support approaches a fully collapsed condition.

It is also an important object of the present invention to provide an improved rear suspension system for a snowmobile wherein the vertical travel of the snowmobile frame relative to the track support is greater than in the known suspension system and provides a travel of approximately seven inches.

It is still another object of the present invention to provide an improved rear suspension system for a snowmobile wherein a particularly comfortable ride is provided for riders, particularly during trail riding of the snowmobile.

It is yet another object of the present invention to provide an improved rear suspension system for a snowmobile wherein the suspension system is characterized by its simplicity and economy of manufacture and use.

It is still a further object of the present invention to provide an improved snowmobile suspension system, specifically an improved rear suspension, wherein the geometrical arrangement between a plurality of links and pivot locations, including those on the snowmobile frame or tunnel and those on the track support, defines a suspension system for the rear of the snowmobile and wherein significant relative movement is provided between the drive belt support frame and the snowmobile frame or tunnel.

Further purposes and objects of the present invention will appear as the specification proceeds.

The foregoing objects are accomplished by providing, in a snowmobile of the type which includes a frame, a continuous drive belt for propelling the snowmobile, the drive belt including a support member having front and rear portions and a drive belt operatively carried by the support member, and a suspension for supporting the drive belt assembly on the frame, the suspension system being of the type which includes a front section and a rear section, an improved rear suspension including first and second links, each having first ends and second ends, an extensible link having a first end and a second end, the first and second links being non-pivotal relative to each other, a first pivot on the snowmobile frame, a second pivot on the snowmobile frame positioned rearwardly of the first pivot, a third pivot spaced downwardly of both the first and second pivots, and a fourth pivot movably positioned relative to the first, second and third pivots, the first ends of the first and second links being pivotally carried by the second pivot, and the second end of the second link and the first end of the extensible link being pivotally carried by the fourth pivot, the geometrical arrangement of the pivots and the links cooperating to define means for suspending the rear portion of the drive belt support relative to the rear of the snowmobile frame while permitting significant relative vertical movement between the support and the frame.

BRIEF DESCRIPTION OF THE DRAWINGS

Particular embodiments of the present invention are illustrated in the accompanying drawings wherein:

FIG. 1 is a pictorial view of a snowmobile on which our improved rear suspension system is mounted;

FIG. 2 is a broken, side elevational view illustrating a suspension system for the snowmobile of FIG. 1, with our improved rear suspension system being shown in a static position;

FIG. 3 is a broken view, similar to FIG. 2, illustrating our improved rear suspension system with the suspension, in full line view, being shown in one extreme position, and, in phantom view, being shown in the other extreme position;

FIG. 4 is an enlarged, broken side elevational view of our improved rear snowmobile suspension system;

FIG. 5 is a sectional view taken along the line 5—5 of FIG. 4;

FIG. 6 is a pictorial view illustrating a suspension system including our improved rear suspension system for supporting the snowmobile frame or tunnel relative to the drive track support assembly;

FIG. 7 is a view, similar to FIG. 4, of an alternate embodiment of our improved rear suspension system; and FIG. 8 is a view taken along lines 8—8 of FIG. 7.

DETAILED DESCRIPTION OF THE PREFERRED EMBODIMENT

Referring to FIG. 1, a snowmobile, generally 10, using our improved rear suspension system, is shown in pictorial view. The snowmobile 10 generally includes an elongated tunnel or frame, generally 12, which has a seat assembly, generally 14, mounted on the top rear portion thereof. A belly pan, generally 16, is secured to the frame or tunnel 12 at the front, lower portion of the snowmobile 10. A hood 18 is mounted on and over the belly pan 16. A pair of steerable, front, shock-mounted skis, generally 20, are mounted at the forward end of the snowmobile 10 and in a position generally below and forwardly of the belly pan 16. The skis 20 are generally steered by a handlebar assembly (not shown).

A drive belt assembly, generally 22, is supported by a slide rail suspension system, generally 24, using our improved rear suspension, generally 26. The suspension system 24 movably supports the drive belt assembly 22 relative to the frame or tunnel 12. In a conventional manner, a drive chain (not shown) is driven by a drive clutch assembly (not shown) which is mounted under the hood 18. The drive clutch assembly is operated by an internal combustion engine (not shown) which is also mounted under the hood 18. In a conventional manner, the drive chain engages a sprocket (not shown) which rotates the drive shaft (not shown). The sprocket (not shown) is securely mounted on the drive shaft and drivably engages driving lugs (not shown) on the inner side of the drive belt 22 in order to operate the belt and propel the snowmobile in a forward direction.

In the foregoing description of the snowmobile 10, a general description of the snowmobile 10 has been provided. Except for the slide rail suspension system 24, and specifically the rear suspension 26, the snowmobile 10, described hereinbefore, is of generally conventional construction.

Referring to FIGS. 5 and 6, the snowmobile frame or tunnel 12 comprises a longitudinally elongated sheet metal member which is generally formed into an inverted U-shape. The tunnel 12 includes a planar top wall 28, upon which the seat 114 is mounted, a pair of spaced, downwardly extending side walls 30, and a pair of outwardly extending fenders or flanges 32 extending from the lower ends of the side walls 30.

Referring to FIGS. 5 and 6, the suspension system assembly 24 generally includes a front suspension assembly, generally 34, the rear suspension assembly 26, and the slide rail assembly, generally 36. The slide rail assembly 36, generally includes a pair of laterally spaced slide rail sections 38, each of which includes a longitudinally extending rigid support member 40 and a longitudinal, low friction, slide member 42 carried on the support 40 and constructed and arranged to slidably bear against the inner surface of the drive belt for slidable support thereof. A bracket 44 is secured to the front end of each of the slide rail sections 38, which are secured together by a transverse support bar 46 mounted on the laterally spaced brackets 44.

A slide bracket 48 is longitudinally adjustably mounted on the rear of each slide rail support 40. A transverse rod 50 is connected, at each end, to the brackets 48. As seen in FIG. 4, the rod 50 is adjustably carried in slide blocks 52 which are adjustably carried within longitudinally elongated openings 54 provided in the slide brackets 48.

The opposed outer ends of the rod 50 carry track idler wheels 56, which, as seen best in FIGS. 4 and 5, support the drive belt assembly 22 along its inner periphery.

A track support roller assembly, generally 58, is positioned above and forwardly of the track idler wheels 56. The track support roller assembly 58 includes a transverse support rod 60 which extends between and is secured at its opposite ends to the side walls 30 of the tunnel 12. A pair of laterally spaced rollers 62 are carried on the rod 60 and guidably support the drive belt or track 22 forwardly and upwardly of the idler wheels 56, as best seen in FIGS. 4, 5 and 6. A pair of sprockets 63 are provided at the front upper end of the drive belt assembly 22. For convenience of illustration and since the wheels 63 form no part of the present invention, the support assembly therefor is not shown herein.

With reference to the drive belt assembly 22, for purposes of simplicity in illustration, the drive belt 22, as seen in FIG. 5, for example, is illustrated as being flat on its inner and outer surfaces. As seen in FIG. 1, suitable drive lugs, which engage the drive sprocket, and guide lugs which cooperate with the slide rail members 42 are provided on the inner periphery of the drive belt 22 and ground engaging lugs (not shown) are commonly provided on the outer periphery of the belt 22.

Again, in a conventional manner, drive cleats 64 are secured to the outer periphery of the drive belt 22 for positively engaging snow or ice.

The front suspension 34, as shown in FIG. 6, illustrates one type of front suspension system that can be utilized in combination with our improved rear suspension assembly 26; it is to be understood, however, that other types of front suspensions may be used. The front suspension 34, illustrated in FIGS. 2 and 6, as exemplary of only one of different front suspension, generally includes a front control arm assembly, generally 66, which is pivotally carried by a shackle assembly, generally 68. The assembly 68 is pivotally carried by the opposed slide rail supports 40 at a location rearwardly of the front ends of the slide rail assemblies 36, and a pair of torsion springs, generally 70. The shackle assembly 68 includes a lower bar 72 which is pivotally carried by the slide rail supports 40. The bar 72 is rigidly secured to an upwardly spaced cross bar 74 of the front control arm assembly 66. The assembly 66 further includes an upper cross bar 78, which has its opposite ends secured to the side walls 30, and rearwardly and downwardly extending arms 80 which are rigidly secured at their lower ends to the cross bar 74.

The torsion springs 70 include a straight, downwardly and forwardly angled portion 82 and a rear coil portion 84, transverse to the angle portion 82. The lower ends of the straight spring portions 82 bear against the opposite ends of the lower front pivot bar 46 carried in the brackets 44. The upper, coiled spring portions 84 are received on the opposite outer ends of the cross bar 78. A bracket 86 receives an adjustable anchor bolt 88. The outer end of each anchor bolt defines an eyelet 90 which is secured to the outer end of the coiled portions 94 of each of the torsion springs 70. The spring tension of the torsion spring 70 is adjustable by the adjustment of the anchor bolts 88.

A rigid rebound stop member 92 is pivotally secured at its lower end to the bar 46 and includes an elongated central aperture 94 which is in slidable engagement with the upper cross bar 78 of the front control arm assembly 66. The rebound stop member 92 limits the amount of movement of the front suspension 34. The torsion springs 70 normally bias the control arm assembly 66 to the full up position. In use, the upper cross bar 78 slidably carries the rebound member 92, which movement opposes the biasing force of the torsion springs 70. The entire front control arm assembly 66 pivots at its lower end relative to the shackle assembly 68, which, in turn, is pivotal in the slide rail supports 40.

As indicated previously, the front suspension assembly 34 forms no part of the present invention which relates to the rear suspension system 36. It is to be understood, however, that the front suspension assembly 34, regardless of design, does operate in cooperative relationship with the rear suspension system 26, as it does form part of the overall slide rail suspension system 24 which suspends the snowmobile tunnel or frame 12 relative to the slide rail support assembly 36. The front suspension 34 and the rear suspension 26 cooperate to define the suspension system 24 which operatively and movably supports the slide rail suspension system 36, which, in turn, operatively carries the tunnel or frame 12. Our improved rear suspension assembly 26 is shown in detail, with references to FIGS. 4, 5 and 6.

The rear suspension assembly 26 includes a rear control arm assembly, generally 96, a pair of spring lever arms, generally 98, and a pair of adjustable, coil spring and shock absorber assemblies, generally 100.

The rear control arm assembly includes a lower transverse rod 102 which is carried at its opposite ends in the laterally spaced slide brackets 48, the pivotal connection of the rod 102 to the slide brackets 48 defining a lower pivot 104 for the control arm assembly 96. The control arm assembly 96 further includes a pair of rigid support arms 106 which extend upwardly, forwardly and outwardly from the opposite ends of the rod 102, as seen best in FIG. 5. The rigid arms 106 are rigidly affixed at their upper ends to a cross bar 108 which is spaced upwardly and forwardly of the rod 102. The cross bar 108 is pivotally mounted on its ends in the opposite side walls 30 of the tunnel 12. The pivot connection of the cross bar 108 with the side wall 30 defines an upper, forward pivot 110 for the rear control arm assembly 96, the arms 106 defining a rigid link between the two pivots 104 and 110.

The outer ends of the cross bar 108 extend outwardly beyond the side walls 30 of the tunnel 12 and, through a splined or hexagonal shaft interconnection 112, non-rotatably receives, in its opposite ends, each of the spring lever arms 98. Each lever arm 98 define a rigid link having its upper, forward end pivotal about the pivot 110 and having a lower, rearward end which pivotally receives a lower forward end of the shock assembly 100 at a pivot connection 114. The spring lever arms 98 and the rear control arm assembly 96, being non-rotatable relative to each other, define a bell crank assembly which is pivotal at its intermediate point about the pivot 110.

The shock assembly 100, defining an extensible and retractable link, includes a longitudinally adjustable shock absorber 116 of substantially conventional construction. The shock absorber 116 includes a lower end which is pivotally connected at the pivot 114 to the arm 98. The upper end of the shock absorber 116 includes an extensible rod 118 which extends axially outwardly of the shock absorber cylinder 120. The upper ends of the rod are secured by a pivot shaft 124 which is rotatably carried by a pair of rigid support brackets 126 which are fixedly secured to the opposite side walls 30 of the tunnel 12. The pivot shaft 124 is positioned in close proximity to the upper surface of the top wall 28 of the tunnel 12. The axis of the pivot shaft 124 defines a pivot connection 128 which is spaced upwardly and rearwardly of the pivot connection 114 at the lower end of the shock absorber assembly 100.

In the operation of the suspension system 26, a significant amount of travel between the snowmobile tunnel or frame 12 and the slide rail suspension assembly 36 is possible. The extreme positions are generally illustrated in FIG. 3 wherein the fully extended position is shown in full line view and the fully retracted position is shown in phantom view.

The geometrical arrangement of the rear control arm assembly 96, spring lever arm 98 and shock assembly 100 relative to each other and relative to the tunnel 12 and slide rail assembly 36 result in the desired "soft" ride quality as the structure enables movement of up to seven inches between the frame 12 and support 36, as compared to a conventional vertical travel of approximately four inches. As seen in FIG. 3, as the snowmobile 10 traverses a trail, the spring lever arm and rear control arm assembly 96, which are non-rotatable relative to each other, pivot relative to the tunnel 12 about the pivot 110, with the lower end of the arms 106 pivoting about the pivot 104 on the slide rail assembly bracket 48. The free ends of the lever arms 98, which define a bell crank with rear control arm assembly 96, are pivotal at 114 relative to the extensible link or shock absorber assembly 100. Since the shock absorber assembly 100 is both extensible and retractable, one extreme position being shown in solid line view in FIG. 3, and the other extreme position, being shown in phantom view, the shock absorber assembly 100 retracts to permit the control arm assembly 96 and spring lever arm 98 to pivot about the axis 110. The movement permits movement of the slide rail support 36 upwardly between the side walls 30 of the tunnel 12 with some rearward movement of the pivot 104.

Referring to FIGS. 7 and 8, an alternate rear suspension system, generally 150, is shown. A drive belt assembly, generally 152, is supported by a slide rail suspension system, generally 154, which uses the alternate rear suspension 150. The slide rail suspension system 154 includes the rear suspension 150 and movably supports the drive belt assembly 152 relative to a tunnel or snowmobile frame, generally 156.

The tunnel 156 is constructed in a manner similar to the frame or tunnel 12, previously described, and is formed into an inverted U-shape and includes a top wall 158 and side walls 160.

As seen best in FIG. 8, a slide rail assembly, generally 162, includes a pair of laterally spaced slide rail sections 164, each of which includes a longitudinally extending rigid support member 166 and a longitudinal, low-friction, slide member 168. The slide member 168 slidably bears against the inner surface of a drive belt 170 for support thereof.

A bracket 172 is mounted on the rear of each slide rail support 166 and a transverse rod 174 is connected at each of its ends to the brackets 172. The opposed outer ends of the rod 174 carry track idler wheels 176 which support a drive belt 170.

A pair of track idler wheels 178 are positioned upwardly and forwardly of the idler wheels 176. The idler wheels 178 are secured to a transverse rod 180 which extends between and is secured at its opposite ends to the side walls 160 of the tunnel 156.

The rear suspension 150 includes a control arm assembly generally 182, a pair of lever arms, generally 184, and a pair of adjustable, coil spring and shock absorber assemblies, generally 186. Each arm assembly 182 includes a first link 188 and a second link 190 which are pivotally interconnected at a pivot 192. The lower end of the second link 190 is pivotal about the axis of the rod 174. The upper end of the first link 188 is rigidly affixed to a cross bar 194 which is positioned above the top wall 158 of the tunnel 156 and is carried in a rigid support 196 which is secured to the opposite side walls 160.

The outer ends of the cross bar 194 extend outwardly beyond the side walls 160 of the tunnel 156 and through a splined or hexagonal shaft interconnection 198 which non-rotatably receives, in its opposite ends, each of the normally upright arms 184. The lower end of each arm 184 pivotally receives the lower forward end of the shock assembly 186 at a pivot connection 200. The arms 184 and first link 188 are non-rotatable relative to each other and the first link 188 and second link 190 are rotatable at the pivot 192 and the second link 190 is pivotal about the rod 172.

The shock assembly 186, defining an extensible and retractable link, includes a longitudinally adjustable shock absorber 202 of substantially conventional construction. The shock absorber 202 is biased by a spring member 204 which is carried thereon. The lower end of the shock absorber, pivotally connected to the arm 184, has an upper end pivotally carried on the support bracket 196 rearwardly and above the top wall 158. The upper end of the shock absorber 202 includes an extensible rod 206 which extends axially outwardly of the shock absorber cylinder 208. The upper ends of each rod 206 are secured together by a pivot shaft 210 which is rotatably carried by the support bracket 196. The shaft 210 is positioned in close proximity to the top wall 158 and defines a pivot connection which is spaced upwardly and rearwardly of the opposite end of the shock absorber 186.

As with the rear suspension system 26, previously described, a significant amount of travel is provided between the snowmobile tunnel 156 and the slide rail assembly 162. The geometrical arrangement, again, of the pivots and links results in the desired "soft" ride quality because the structure enables movement of up to seven inches between the tunnel 156 and the slide rail assembly 162. As a snowmobile traverses a trail, the shock absorber assemblies 186, which are extensible and retractable, pivot about their opposite ends. The arms 184 are non-rotatable relative to the first link 188 and the first link 188 is pivotable about the pivot 192 relative to the second link 190. This movement permits movement of the slide rail support upwardly between the side walls of the tunnel to thereby provide substantially the same advantages as the rear suspension system 26 previously described.

The rear suspension systems, as described, both provide the significant advantage of increasing the ride rate as a result of the rear control arm/spring geometry. In this way, when the slide rail assembly is deflected upwardly, the spring arm compresses the shock absorber assembly which has a compressible spring thereon. The described suspension provides the desired light spring rate for the "ride-in" effect and a progressive linkage system which cooperate to cause the spring travel to increase as the vertical travel between the tunnel and the drive belt support approaches a fully collapsed condition.

The shock absorber assemblies are both adjustable and readily removable, as they are accessible by being mounted outboard of the side walls 30. Because of the splined or hex shaft connection between the rear control arm and spring lever and because of the easy removability of the shock absorbers, the amount of ride stiffness and passenger load requirement is readily adjusted. In the case of suspension travel of seven inches, for example, approximately four inches is allowed for travel due to "bouncing" and about three inches is allowed for static deflection due to the weight of the tunnel assembly and the weight of the rider. The vertical stiffness is desirably approximately 60 pounds per inch. Again, all such parameters may be increased or decreased as desired to meet the snowmobile ride and handling objectives. Further, the described suspension system is applicable to any recreational or non-recreational snowmobile, racing snowmobile or non-racing snowmobile.

While in the foregoing there has been provided a detailed description of particular embodiments of the present invention, it is to be understood that all equivalents obvious to those having skill in the art are to be included within the scope of the invention, as claimed.

What we claim and desire to secure by Letters Patent is:

1. In a snowmobile having a frame, a drive belt assembly for propelling said snowmobile, said drive belt assembly including a suspension system for supporting said drive belt assembly on said frame, said suspension system being of the type which includes a front suspension section and a rear suspension section, an improved rear suspension section comprising, in combination, a first link member having a first end and a second end, a second link member having a first end and a second end, an extensible link member having a first end and a second end, said first and second link members being non-pivotal relative to each other, a first pivot defined on said snowmobile frame, a second pivot defined on said snowmobile frame and being positioned away from said first pivot, a third pivot spaced away from both said first and second pivots, a fourth pivot movably positioned relative to said first, second and third pivots, said first ends of said first and second link members being pivotally carried by said first pivot, said second end of said extensible link member being pivotally carried by said fourth pivot, said first link member including a first link section and a second link section, and fifth pivot for pivotally interconnecting said first and second link sections.

2. The improvement of claim 1 wherein said first and second link members and said extensible member cooperate to define means for suspending the rear portion of said drive belt assembly relative to the rear of said snowmobile frame while permitting significant relative movement between said assembly and said frame.

3. The improvement of claim 1 wherein said first link member and said second link member define a bell crank.

4. The improvement of claim 1 wherein said extensible link member comprises a shock absorber.

5. The improvement of claim 4 wherein said shock absorber is adjustable and includes a compression spring operatively mounted thereon.

6. The improvement of claim 1 including a pair of each of said first link member, second link member and said extensible link member.

7. The improvement of claim 1 wherein said extensible link member is positioned outwardly of said snowmobile frame for accessibility.

8. The improvement of claim 1 wherein said extensible link member comprises a spring biased shock absorber.

9. The improvement of claim 1 wherein said first and second link members are single, rigid links.

10. In a snowmobile having a frame, a drive belt assembly for propelling said snowmobile, said drive belt assembly including a support member having front and rear portions and a drive belt operatively carried by said support member, and a suspension system for supporting said drive belt assembly on said frame, said suspension system being of the type which includes a front suspension section and a rear suspension section, an improved rear suspension section comprising, in combination, a first link member having a first end and a second end, a second link member having a first end and a second end, an extensible link member having a first end and a second end, said first ends of said first and second link members being pivotally mounted on said snowmobile frame and being non-pivotal relative to each other, said second end of said first link member being pivotally carried by said rear portion and said support member, said second end of second link member being pivotally connected to said first end of said extensible link member, said extensible link member being pivotally mounted on said snowmobile frame above said second end of said link member, said first link member including a first link section and a second link section which are pivotally interconnected together.

11. The improvement of claim 10 wherein said first and second link members and said extensible member cooperate to define means for suspending the rear portion of said drive belt support relative to the rear of said snowmobile frame while permitting significant relative movement between said support and said frame.

12. The improvement of claim 10 wherein said first link member and said second link member define a bell crank.

13. The improvement of claim 10 wherein said extensible link member comprises a shock absorber.

14. The improvement of claim 13 wherein said shock absorber is adjustable and includes a compression spring operatively mounted thereon.

15. The improvement of claim 10 including a pair of each of said first link member, second link member and said extensible link member.

16. The improvement of claim 10 wherein said extensible link member is positioned outwardly of said snowmobile frame for accessibility.

17. The improvement of claim 10 wherein said extensible link member comprises a spring biased shock absorber.

18. The improvement of claim 10 wherein said first and second link members are single, rigid links.

19. In a snowmobile having a frame, a drive belt assembly for propelling the snowmobile, said drive belt assembly including a support member having front and rear portions and a drive belt operatively carried by said support member, and a suspension system having said drive belt on said frame, said suspension system being of the type which includes a front suspension section and a rear suspension section, an improved suspension system comprising, in combination, a first link member having a first end and a second end, a second link member having a first end and a second end, an extensible link member having a first end and a second end, said extensible link member comprising a shock absorber and spring assembly, said first and second link members being pivotally mounted on said snowmobile frame and being non-pivotal relative to each other, said second end of said first link member being pivotally carried by said rear portion of said support member, said second end of said second link member being pivotally connected to said first end of said extensible link member, said extensible link member being pivotally mounted on said snowmobile frame, and said first link member, said second link member and said shock absorber and spring assembly defining means for defining a progressive linkage assembly wherein said spring travel becomes progressively greater as the movement between said frame and said support approaches a fully collapsed condition.

20. The improvement of claim 19 wherein said first and second link members define a bell crank.

21. The improvement of claim 19 wherein said shock absorber is adjustable and said spring is a compression spring operatively mounted on said shock absorber.

* * * * *